US006490718B1

(12) United States Patent
Watters

(10) Patent No.: US 6,490,718 B1
(45) Date of Patent: Dec. 3, 2002

(54) SYSTEM AND METHOD FOR PROCESSING ELECTRONIC DATA INTERCHANGE USING A GRAPHICAL REPRESENTATION

(75) Inventor: Richard L. Watters, Palo Alto, CA (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 08/646,656

(22) Filed: May 8, 1996

(51) Int. Cl.[7] .................................................. G06F 9/44
(52) U.S. Cl. ....................................... 717/100; 707/523
(58) Field of Search ............................... 395/701, 200.3, 395/705, 500, 200.05, 707, 182.16; 705/21, 1, 26, 37; 707/513, 524, 523, 522, 516; 364/225, 225.3; 345/349, 329, 962; 717/100

(56) References Cited

U.S. PATENT DOCUMENTS

| 5,202,977 | A | * | 4/1993 | Pasetes et al. ............... 395/701 |
| 5,367,664 | A | * | 11/1994 | Magill et al. .................. 714/16 |
| 5,486,686 | A | * | 1/1996 | Zdybel et al. ............... 235/375 |
| 5,557,780 | A | * | 9/1996 | Edwards et al. ............. 395/500 |
| 5,758,126 | A | * | 5/1998 | Daniels et al. ............... 395/701 |
| 5,794,206 | A | * | 8/1998 | Wilkerson et al. .......... 395/701 |
| 5,897,695 | A | * | 4/1999 | Walters |

OTHER PUBLICATIONS

Press Release Stratford Software, Inc. Electronic Data Systems (EDS) of Plano, Texas. Contract to provide EDI, No Date.*
Procurement Card Software Firm Hires EDS. Valerip Block American Banker Inc, credit/Debit/ATMS p. 14, Jun. 22, 1995.*
Sprint–EDS Union Holds Global Promise, Bob Wallace Infoworld p. 156, May 23, 1994.*
SIDUS Awards EDS Global Logistics Management Contract PR Newswire Financial News Section, Oct. 17, 1994.*
EDS to Market Maxxus System, American Banker Management Strategies p. 11A, Jun. 20, 1994.*
Tandem Selects EDS to Provide Worldwide Desktop Logistics Services, Financial News PR Newswire, Sep. 29, 1994.*
Info Super–Buyway Crain Communications Inc. Laurie Freeman Special Section p. 8, May 15, 1995.*
Commercial Cards Stir Visions of a New Frontier American Banker, Valerie Block p. 12, Jun. 28, 1995.*
State Consortium Unveils Paperless Tax Network for Business, PR Newswire Financial News Section, Jan. 12, 1994.*
EDS Becomes Sponsoring Member to Commerce Net; EDS Joins Consortium to Develop Electronic Marketplace on the Internet, Mar. 31, 1995.*
Paying Heed to Payments, American Banker, Jeff Nutler Technology/Operations Section p. 18, Nov. 17, 1994.*
EDS Plans $100 Million for Mortage Technology, National Mortage News, Orla O'Sullivan p. 5, Mar. 6, 1995.*
EDS Goal to Reshape the Mortgage Industry, American Banker, Tracey Tucker, Technology/Operations p. 16, May 26, 1995.*

(List continued on next page.)

Primary Examiner—Tuan Q. Dam
Assistant Examiner—Todd Ingberg
(74) Attorney, Agent, or Firm—Baker Botts L.L.P.

(57) ABSTRACT

A method for processing electronic data is provided. The method includes creating a visual analog (20) of a data format for the electronic data and converting the visual analog (20) into data processing commands (24). Electronic data may then be processed with the data processing commands (24).

38 Claims, 1 Drawing Sheet

OTHER PUBLICATIONS

Data Interchange Standards Association (DISA) Membership WWW.disa.org 333 John Caryle Street #600 Alex. VA., Dec. 9, 1999.*

ANSI Standards Membership, Dec. 9, 1999.*

"The Web Server Book", by J. Magid et al. Ventana Press, published Jul. 28, 1995, Chapters 1–13.*

"1997 Phillips EDI Yellow Pages", Twelfth Edition, EDS Advertisement as being able to provide a paperless method of doing business, Jan. 1997.*

"EDI The Competitive Edge", Phyllis K. Sokol, EDI Third Party Service Provider—EDI Since the 1980's, Dec. 1989.*

X.500 Directory Services Support For Electronic Data Inter Change (EDI), Computer Networks and ISDN Systems D. O'Mahoney et al., Mar. 1995.*

On–line Programming System User's Manual, L. N. Gross Mitre Corporation, Mar. 1967.*

Dictionary Computers Information Processing & Telecommunications Second Edition J. M. Rosenberg, 1987.*

Microsoft Computer Dictionary pp. 81–82, 143, 1993.*

"What is ACS X12?" From the WWW.DISA.org Web Page, Apr. 18, 2000.*

From EDI to Electronic Commerce a Business Initiative Phyliss K. Sokol, Nov. 1994.*

Microsoft Getting Results with Microsoft Office foe Windows 95, 1995.*

PowerBuilder 5.0 for C/C+ +, May 1996.*

Microsoft Word Using Microsoft Word, 1995.*

IBM Dictionary, 1994.*

Microsoft Dictionary, 1997.*

Webster's II Dictionary, 1994.*

* cited by examiner

SYSTEM AND METHOD FOR PROCESSING ELECTRONIC DATA INTERCHANGE USING A GRAPHICAL REPRESENTATION

TECHNICAL FIELD OF THE INVENTION

This invention relates in general to the field of data processing, and more particularly, to a system and method for processing electronic data interchange information.

BACKGROUND OF THE INVENTION

Electronic data interchange (EDI) generally refers to the process of transmitting and receiving data in a predetermined digital format. This process has been standardized by the American National Standards Institute (ANSI). ANSI Standard ASC X.12 Version 3 release 6 is the latest standard promulgated by the ANSI Accredited Standards Committee (ASC) for EDI. Although this standard may constantly change, the standard remains a uniform EDI format for use by organizations involved in EDI.

The ANSI Standard organizes EDI into five levels. The first level of EDI under the ANSI Standard is known as the Interchange Control Structure. At this level, the organizations sending and receiving the EDI data are identified, and control information about the subsequent levels is provided.

The second level of EDI under the ANSI Standard is known as the Functional Group Structure. At this level, one or more groups of data in the subsequent levels are identified and control information about those groups is provided.

The third level of EDI under the ANSI Standard is known as the document type or "transaction set." At this third level, approximately 300 typical documents have been standardized by ANSI. Examples of standardized documents in the third level are bills-of-sale, production schedules, shipping manifests, and many other documents.

The fourth level of organization under the ANSI Standard for EDI documents is known as the "segment." In general, a transaction set is made up of one or more segments. Examples of segments in ANSI Standard EDI documents are seller name, seller address, seller geographic location, and pricing information.

The fifth level of organization for ANSI Standard EDI documents is known as the "element." In general, a segment is made up of one or more elements. Examples of elements found in the "seller geographical location" segment are city name, state/province code, postal code, and country code.

In essence, the ANSI EDI Standard is a set of general rules for developing a set of specific rules for creating and interpreting electronic documents based upon the transaction set, segments, and elements specified in the ANSI Standard. Organizations can then program data processing equipment to recognize the appropriate transaction sets, segments, and elements in EDI information.

Although transaction sets, segments, and elements have been defined in the ANSI EDI Standard, many segments and their associated elements for a particular transaction set are optional. Therefore, organizations may have the same transaction set or document, but may also have different segments and elements for that transaction set. Furthermore, the variations in segments in a transaction set may complicate the processing of the data associated with such a transaction set. Optional segments and segment variations essentially result in a large number of potential formats for any given EDI transaction set. Such a situation may complicate the processing of EDI information between organizations.

The data processing equipment for processing the many data formats must be programmed to handle each new data format. Existing software tools for generating the data processing programs for responding to new data formats are sometimes time-consuming to use because they may require frequent referral to a cumbersome ANSI Standard when writing the data processing software. In addition, existing software tools may not be capable of generating data processing programs for processing EDI document formats that deviate from ANSI Standard formats.

SUMMARY OF THE INVENTION

Therefore, a need has arisen for an improved system and method for processing EDI information and other electronic information. In particular, a need has arisen for a system and method for generating data processing commands for processing data associated with a new data format.

In accordance with the present invention, an electronic data interchange information system and method are provided that substantially eliminate or reduce disadvantages and problems associated with previously developed electronic data processing systems.

One aspect of the present invention provides a method for processing electronic data. The method includes creating a visual analog of a data format for the electronic data and converting the visual analog into data processing commands. The electronic data may then be processed with the data processing commands.

Another aspect of the present invention provides a method for generating data processing commands for processing electronic data. The method includes creating a visual analog of a data format for the electronic data. The method further includes converting the visual analog into data processing commands for processing the electronic data.

Yet another aspect of the present invention provides a system for processing electronic data. The system includes a processor for generating a visual analog representing a data format for the electronic data. The system also includes a command set generator for converting the visual analog into data processing commands.

The present invention provides several technical advantages. One technical advantage of the present invention is that a data processing program may be generated to process a new data format without referring to the ANSI EDI Standard or any other standard. This simplifies the task of creating the data processing software for processing the new data format.

Another technical advantage of the present invention and method is that it provides an improved methodology for developing data processing programs for processing electronic data. With the present invention, new or non-standard data formats may be accommodated in a fraction of the time required with previously developed systems.

Yet another technical advantage of the present invention is that it provides a user-friendly tool for developing data processing programs. The present invention may increase the efficiency of a programmer in developing data processing programs. The present invention, therefore, may reduce the expense associated with processing electronic information.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein.

Figure 1:
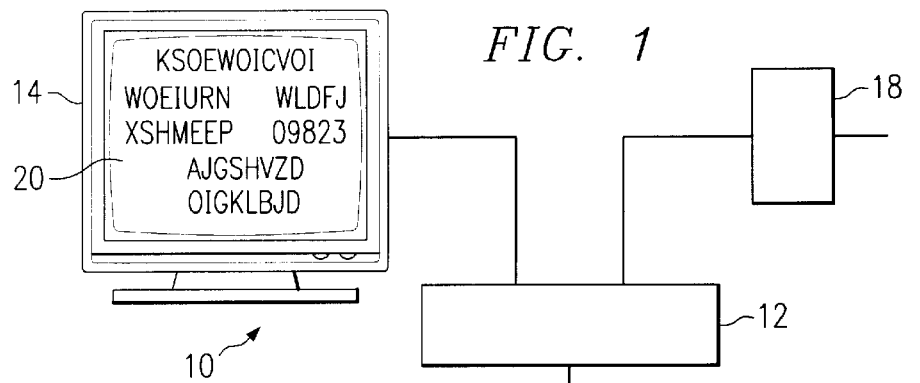
FIG. 1 illustrates an exemplary system for processing electronic data embodying concepts of the present invention.

DETAILED DESCRIPTION OF THE INVENTION:

FIG. 1 shows system 10 embodying concepts of the present invention for processing electronic data. System 10 preferably includes processor 12, user interface 14, memory 16, and external communications medium interface 18. Processor 12 may be, for example, a microprocessor, a personal computer, a work station, or many other devices capable of executing computer commands. User interface 14 couples to processor 12, and may be, for example, a cathode-ray tube display, a liquid-crystal display, or many other display devices capable of presenting information. The combination of processor 12 and user interface 14 provides the capability to generate documents, such as word processing, graphics, or computer-aided design documents.

Memory 16 couples to processor 12, and may be a magnetic storage medium, a random access memory, an optical storage medium, or many other types of storage media. External communications medium interface 18 couples to processor 12, and may be, for example, a public-switched telephone network modem, an integrated services digital network interface device, or many other devices for interfacing with an external telecommunications medium.

User interface 14 in connection with processor 12 is capable of generating and displaying visual analog 20, which is preferably a graphical display that represents a data format, e.g., a bill-of-sale. The document or transaction set format represented by visual analog 20 corresponds to electronic data to be processed by system 10.

Memory 16 preferably includes command set generator 22, data processing command set 24, and input data 26. Command set generator 22 contains instructions executed by processor 12 for receiving visual analog 20 as an input and outputting data processing commands for processing input data 26 associated with visual analog 20. The data processing commands generated by processor 12 are stored in data processing command set 24. Input data 26 represents any electronic data to be processed by system 10.

Visual analog 20 may be created on user interface 14 using commercially-available word processing (WP), graphics, or computer-aided design (CAD) programs. When a WP program is used to create visual analog 20 on interface 14, visual analog 20 is a WP screen that may be stored as a WP data file. Likewise, when visual analog 20 is created using a graphics or computer-aided design (CAD) program, visual analog 20 is a graphics or CAD screen that may be stored as a graphics or CAD data file, respectively.

After visual analog 20 has been created on user interface 14, command set generator 22 converts visual analog 20 into data processing commands that can process input data 26.

Many methods may be used to convert visual analog 20 into data processing commands. As previously mentioned, visual analog 20 may be converted into a data file, such as a WP data file, graphics data file, or CAD data file. Data processing commands may be entered directly into a specific field in visual analog 20, such that data processing command set 24 is created by isolating the data fields containing these commands. By this way, data fields in visual analog 20 may be correlated to appropriate data processing commands so that the data in the data fields are identified and appropriately processed.

Alternately, command set generator 22 may convert these data files into data processing commands by identifying and isolating data fields in the data file and matching the data fields to data fields in a predetermined reference file. The reference file, in turn, correlates the data fields to data processing commands. One skilled in the art will recognize that many methods may be used to convert visual analog 20 to data processing command set 24 without departing from the spirit and scope of the present invention.

Data processing commands created by processor 12 operating command set generator 22 may be stored in data processing command set 24 when processing the data associated with input data 26. Processor 12 executes data processing command set 24 when processing the data associated with input data 26. Processor 12 may be programmed to execute data processing command set 24 automatically or in response to an activation command. Data stored in input data 26 or received via communications medium interface 18 may be processed by processor 12 according to the data processing commands stored in data processing command set 24.

The input data to system 10 may be received by many methods. Data may be received and stored in input data 26 by copying data from another data file or data may be received over external communications medium interface 18. Additionally, a data stream may be processed directly by processor 12 executing data processing command set 24 when the data is received over external communications medium interface 18.

In summary, system 10 allows a user to create data processing commands by first creating visual analog 20. Command set generator 22 then converts visual analog 20 into data processing commands and stores these commands in data processing command set 24. Data processing command set 24 may be executed by processor 12 to process input data 26 or a data stream received over external communications medium interface 18 as represented in visual analog 20.

System 10 in FIG. 1 will be described in greater detail with respect to processing data files using the EDI Standard. One skilled in the art will recognize that many other types of data files may be processed using the present inventive system and method without departing from the spirit or scope of the present invention.

Figure 2:
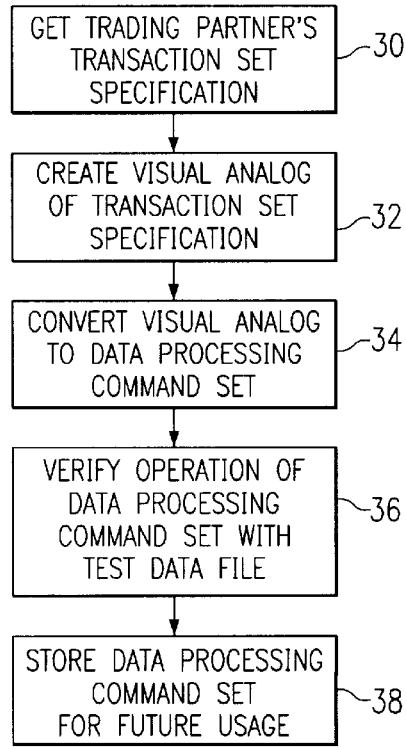
FIG. 2 depicts a flow chart of a method embodying concepts of the present invention for converting an EDI data file into a system-specific data format.

FIG. 2 is a flow chart of an exemplary process embodying concepts of the present invention for creating data processing commands for processing a system-specific data format from an EDI data file. At step 30 a trading partner's transaction set specification is obtained. For example, if Company A wishes to receive and process EDI data files from Company B, then Company A must obtain information on Company B's data format, which is known as Company B's transaction set specification. As previously noted, a transaction set specification contains a listing of the data format and examples of the data to be provided by a trading partner. This data format includes segments and elements described and defined in the ANSI EDI Standard, but implements many of the options and conditions allowed for actual use by that standard, as well as other data fields that are not provided for. This combination of defined segments and elements implemented with options and conditions for actual use in a transaction set can lead to difficulty in processing the data in input data 26 of FIG. 1. To overcome these potential difficulties the present invention, as previously described, provides a novel system and method for creating data processing commands for processing input data 26 as actually used by trading partners.

Returning to FIG. 2, at step 32 visual analog 20 is created from the trading partner's transaction set specification. As previously noted, the visual analog may be created by many methods and is similar in appearance to the trading partner's transaction set specification. Visual analog 20 may also be annotated with additional command information that provides "flags" to command set generator 24 when generating commands for visual analog 20. Examples of the command information that may be annotated on visual analog 20 includes for example, "output designators" and "triggers." Also, typically a portion of the data in an EDI file may comprise control characters, field delimiters, or other similar non-substantive data that is not truly "data". Visual analog 20 may be used to identify substantive data fields that should be output to a data file as well as non-substantive data fields that may be read and processed but that may not be required for further processing. Substantive and non-substantive data fields, as well as "output designations" and "triggers," are described in greater detail in discussions relating to Tables 1 through 5 below.

At step 34 visual analog 20 is converted by processor 12 into data processing command set 24. Conversion is preferably accomplished by processor 12 executing command set generator 22 as previously described in discussions relating to FIG. 1. Executing command set generator 22, processor 12 reads visual analog 20, or a data file that corresponds to visual analog 20, and generates appropriate data processing commands. As previously described in discussions relating to FIG. 1, many processes may be used to generate data processing commands from visual analog 20 without departing from the spirit or the scope of the present invention. Data processing command set 24 generated from visual analog 20, allows processor 12 to process a data file that contains data in the format shown in visual analog 20.

At step 36, the data processing commands created at step 34 may be verified with a test data file. The test data file is in the format specified by the trading partner and is typically provided by the trading partner. After successful processing of the test data file using data processing command set 24, data processing command set 24 may be stored, for example in memory 16, at step 38 for future use.

Figure 3:
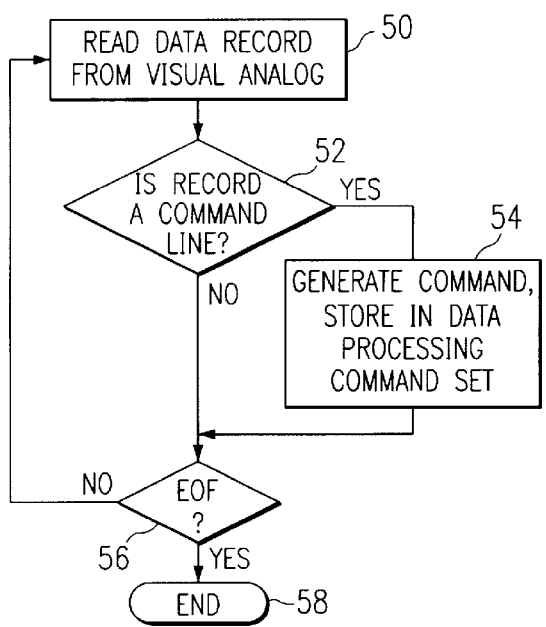
FIG. 3 is an exemplary flow chart embodying concepts of the present invention for a method of converting a visual analog into a data processing command set with a command generator.

FIG. 3 is an exemplary flow chart for one method for converting visual analog 20 into data processing command set 24 with command generator 22 and processor 12 in accordance with the present invention. At step 50 processor 12 reads a data record from visual analog 20 or a data file representing visual analog 20. At step 52 processor 12 determines if the data record read at step 50 is a comment line or similar non-substantive data or if the data record contains an operator. This determination may be accomplished by comparing the data record to a list of allowable commands, checking for the presence of a command within a specific data range, or many other methods that identify data sequences within a data record.

If the data record is an operator the method proceeds to step 54, where the command corresponding to the data record is stored in data processing command set 24. Additionally, command set generator 22 can generate appropriate commands from data streams in visual analog 20. After the current data record is processed and the command is stored at step 54, the method proceeds to step 56 where it is determined whether the next data record is an end-of-file (EOF) marker. If the next data record is not an end-of-file marker at step 56, the process returns to step 50 where the next data record is read, otherwise, the process terminates at step 58.

Figure 4:
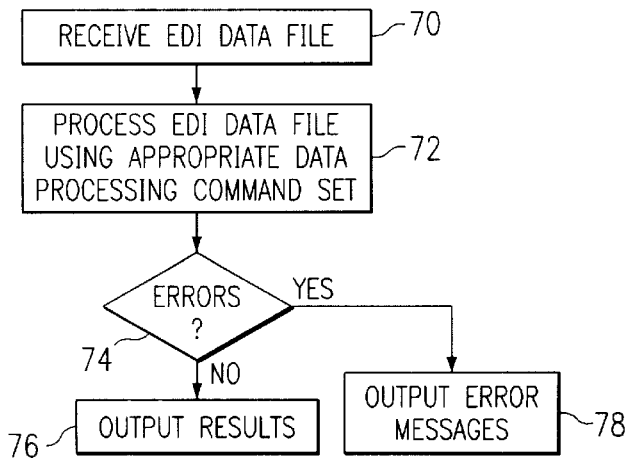
FIG. 4 is a flow chart for an exemplary method for converting an EDI data file into a system-specific data format in accordance with the present invention.

FIG. 4 is an exemplary flow chart for a method for converting an EDI data file into a system-specific data format in accordance with the teachings of the present invention. Beginning at step 70, an EDI data file is received as represented by input data 26 in FIG. 1. This EDI data file may be transmitted over many suitable telecommunication mediums and received by communications medium 18 as previously described.

At step 72 the received EDI data file is processed using appropriate data processing commands, which are represented by data processing command set 24 in FIG. 1. Furthermore, the actual generation of data processing command set 24 as represented by step 34 in the flow chart of FIG. 2 may occur at step 72. When data processing command set 24 is created at step 72, visual analog 20 may be stored in appropriate memory where it may be accessed by command set generator 22 so that a set of data processing commands may be generated for processing the EDI data file. Processing of the EDI data file may be automated or performed continuously by including identifiers in the EDI data file that specify an appropriate data processing command set that should be used to process the EDI data.

At step 74 a test for errors that may occur during processing of the EDI data file during step 74 may be performed. When no errors are detected, the process proceeds to step 76 where the results of the data after processing at step 72 are output to a data file. Outputting the results at step 76 may include generating a report, updating an existing data file, transmitting the data file to a remote location, or other similar activities. If an error is detected at step 74, the method represented by the flow chart in FIG. 4 proceeds to step 78 when error messages are preferably output. Errors may occur in the processing of EDI data at step 72 for numerous reasons, including, for example, due to incompatibility between the data processing command set and the EDI data. Additionally, when errors are detected at step 74 all data processing may be suspended.

While a detailed description of the present invention has been provided, an example of its operation may be beneficial to a further understanding of the present invention and its technical advantages. Accordingly, an example of the present system and method for processing electronic data will be described in discussions relating to Table 1 through 4.

TABLE 1

| Element | Description | Qualifiers/Definition | Length |
|---------|-------------|----------------------|--------|
| N101 98 | Entity ID Code | "RL" (Cineplex) "TH" (Circuit) | 2/2 |
| N102 93 | Sender's Name | Exhibitor partner name | 1/35 |
| N103 66 | ID Code Qualifier | "93" "12" | 1/2 |

TABLE 1-continued

| Element | Description | Qualifiers/Definition | Length |
|---|---|---|---|
| N104 67 | Sender's ID Code | (AS assigned) | 2/17 |

Table 1 shown above is an example of an excerpt from EDI transaction set specification 170, Revenue Receipts Statement, used by theater chains as defined by ANSI Standard ASC X12S/91-1000. The EDI data shown in Table 1 is an example of an EDI "N1" segment from transaction set specification 170, which is defined by the ANSI EDI Standard as a name segment having four elements. Transaction set specification 170 may also contain other segments besides the "N1" segment.

The elements of the N1 name segment as shown in Table 1 and as derived from the ANSI EDI Standard are the Entity ID Code, the Sender's Name, the ID Code Qualifier, and the Sender's ID Code. The entity ID code, as shown, further contains a "Cineplex" identifier, which has an ANSI EDI designation as "RL," and a "Circuit" identifier, which has an ANSI EDI designation of "TH." As previously noted, the ANSI EDI Standard allows the N1 name segment to be used in many different transaction set specifications, and also allows the individual elements of the N1 name segment to be used in other segments. In other transaction set specifications, other ANSI EDI designators may be used instead of "RL" and "TH."

TABLE 2

| Element | Description | Qualifiers/ Definition | | Length |
|---|---|---|---|---|
| N101 98 | Entity ID Code | "RL" (Cineplex) "TH" (Circuit) | ID CODE | 2/2 |
| N102 93 | Sender's Name | Exhibitor partner name | | 1/35 |
| N103 66 | ID Code Qualifier | "93" | | 1/2 |
| N104 67 | Sender's ID Code | (As assigned) | | 2/17 |
| N1RL01 98 | Cineplex ID Code | "RL" | | 2/2 |
| N1RL02 93 | Cineplex Name | | | 1/35 |
| N1RL03 66 | ID Code Qualifier | "93" "12" | | 1/2 |
| N1RL04 67 | Sender's ID Code | (As assigned) | | 2/17 |
| N1TH01 98 | Theater Circuit ID Code | "TH" | | 2/2 |
| N1TH02 93 | Theater Circuit Name | | 1/35 | |
| N1TH03 66 | ID Code Qualifier | "93" "12" | | 1/2 |
| N1TH04 67 | Sender's ID Code | (As assigned) | | 2/17 |

Table 2 is an example of the next step taken to transform a trading partner's transaction set specification into a visual analog in accordance with concepts of the present invention. As previously noted, element N101 from Table 1 is shown under the qualifier/definition column to include both an RL identifier and a TH identifier. In accordance with the ANSI EDI Standard, this signifies that there will be a separate N1 or name segment for the RL identifier, and a separate N1 or name segment for the TH identifier. Table 2 as shown includes these additional identifiers as elements in rows 5–12. This expansion can be performed without referencing the ANSI EDI Standard because the ANSI EDI Standard has been used in generating the information in Table 1. Thus, a user with knowledge of the ANSI EDI Standard can expand the data in Table 1 to the data in Table 2 without needing to refer to the ANSI EDI Standard.

TABLE 3

| Element | Description | Qualifiers/ Definition | | Length |
|---|---|---|---|---|
| N101 98 | Entity ID Code | "RL" (Cineplex) "TH" (Circuit) | ID CODE | 2/2 |
| N102 93 | Sender's Name | Exhibitor partner name | | 1/35 |
| N103 66 | ID Code Qualifier | "93" "12" | | 1/2 |
| N104 67 | Sender's ID Code | (As assigned) | | 2/17 |
| N1RL01 98 | Cineplex ID Code | "RL" | | 2/2 |
| N1RL02 93 | Cineplex Name | | | 1/35 |
| N1RL03 66 | ID Code Qualifier | "93" "12" | | 1/2 |
| N1RL04 67 | Sender's ID Code | (As assigned) | | 2/17 |
| N1TH01 98 | Theater Circuit ID Code | "TH" | | 2/2 |
| N1TH02 93 | Theater Circuit Name | | | 1/35 |
| N1TH03 66 | ID Code Qualifier | "93" "12" | ID CODE | 1/2 |
| N1TH04 67 | Sender's ID Code | (As assigned) | | 2/17 |
| N1TH9303 66 | ID Code Qualifier | "93" | | 1/2 |
| N1TH9304 67 | Sender's ID Code | (As assigned) | | 2/17 |
| N1TH1203 66 | ID Code Qualifier | "12" | | 1/2 |
| N1TH1204 67 | Sender's Telephone | | | 2/17 |

Table 3 is an example of the next step taken to transform a trading partner's transaction set specification into a visual analog. Element N103 from Table 1 is shown under the qualifier/definition column to include both a "93" and a "12" identifier. These "93" and "12" identifiers have a specific meaning under the ANSI EDI Standard, but that meaning is not needed to convert the transaction set specification into visual analog 20. The only significance of these identifiers is that there will be a separate N103 and N104 elements for the "12" identifier, and a separate N103 and N104 elements for the "93" identifier. Table 3 includes these additional identifiers as elements in rows 13–16.

As noted in discussions relating to Table 2, this expansion can be performed without referencing the ANSI EDI Standard because the ANSI EDI Standard is used to derive the information in Table 1. Thus, a user with knowledge of the ANSI EDI Standard can expand the data in Table 1 to the data in Table 2 without referring to the ANSI EDI Standard.

TABLE 4

| Element | Description | Qualifiers/ Definition | | Length |
|---|---|---|---|---|
| N101 98 | Entity ID Code | "RL" (Cineplex) "TH" (Circuit) | ID CODE | 2/2 |
| N102 93 | Sender's Name | Exhibitor partner name | | 1/35 |
| N103 66 | ID Code Qualifier | "93" "12" | | 1/2 |

TABLE 4-continued

| Element | Description | Qualifiers/ Definition | | Length |
|---|---|---|---|---|
| N104 67 | Sender's ID Code | (As assigned) | | 2/17 |
| N1RL01 98 | Cineplex ID Code | "RL" | | 2/2 |
| N1RL02 93 | Cineplex Name | | OUTPUT | 1/35 |
| N1RL03 66 | ID Code Qualifier | "93" "12" | | 1/2 |
| N1RL04 67 | Sender's ID Code | (As assigned) | OUTPUT | 2/17 |
| N1TH01 98 | Theater Circuit ID Code | "TH" | | 2/2 |
| N1TH02 93 | Theater Circuit Name | | | 1/35 |
| N1TH03 66 | ID Code Qualifier | "93" "12" | ID CODE | 1/2 |
| N1TH04 67 | Sender's ID Code | (As assigned) | | 2/17 |
| N1TH9303 66 | ID Code Qualifier | "93" | | 1/2 |
| N1TH9304 67 | Sender's ID Code | (As assigned) | OUTPUT | 2/17 |
| N1TH1203 66 | ID Code Qualifier | "12" | | 1/2 |
| N1TH1204 67 | Sender's Telephone | | OUTPUT | 2/17 |
| . | | | | |
| . | | | | |
| . | | | | |
| Box 04 792 | Gross Box Office Receipts | | TRIGGER | 1/15 |

Table 4 is an example of the next step taken to transform a trading partner's transaction set specification into a visual analog. Table 4 is similar to Table 3, except for the addition of operators in column three, such as "OUTPUT" and "TRIGGER" identifiers previously mentioned. The OUTPUT and TRIGGER identifiers specify where certain operations must be performed in processing data. Command set generator 22 recognizes these OUTPUT and TRIGGER identifiers, and includes appropriate data processing commands in data processing command set 24 to cause processor 12 to perform the required operations.

For example, the OUTPUT designator identifies that the information shown in the corresponding data field should be output to a data file. Likewise, the TRIGGER identifier indicates that the data shown in the corresponding data field is a trigger. A TRIGGER may be required to signify an operation, such as the end of a data record in a system-specific data format. Many other operators besides OUTPUT and TRIGGER operators may be included in the visual analog without departing from the spirit or scope of the present invention.

Additionally, as represented in Table 4, only a small portion of the data in Table 4 may be required for OUTPUT or TRIGGER purposes. The present invention provides a method for mapping an EDI data file into a command set file template. This command set file template blocks off the data that is required by the user, such as by OUTPUT in a system-specific data format or to TRIGGER additional operations. Each EDI data element is the member of a domain that can be mapped into a range specified in the command set file template.

TABLE 5

| | | (Reserved for ID CODE) | (Reserved for staged data) |
|---|---|---|---|
| . | | | |
| . | | | |
| . | | | |
| N101 | ID CODE | | |
| N102 | | | |
| N103 | | | |
| N104 | | | |
| N1RL01 | | | |
| N1RL02 | | OUTPUT | |
| N1RL03 | | | |
| N1RL04 | | OUTPUT | |
| N1TH01 | | | |
| N1TH02 | | OUTPUT | |
| N1TH03 | ID CODE | | |
| N1TH04 | | | |
| N1TH9303 | | | |
| N1TH9304 | | OUTPUT | |
| N1TH1203 | | | |
| N1TH1204 | | OUTPUT | |
| . | | | |
| . | | | |
| BOX04 | | | TRIGGER |
| . | | | |
| . | | | |

Table 5 is an example of the final structure of a visual analog, which may be used to understand the operation of data processing command set 24 generated from visual analog 20 by command set generator 22 operating on processor 12. As an EDI data file is read by processor 12 operating data processing command set 24, the data is mapped according to commands corresponding to operators shown in Table 5. The table cells in the left-most column of FIG. 5 represent a user-specified range that is based on data derived from the trading partner's transaction set specification. Thus, a datum from a data file such as input data 26 in FIG. 1 may be mapped into the first cell labeled N101, and in the cell to the right, in the same row, is a cell which contains the operator ID CODE. This operator in visual analog 20 may result in a data processing command to store this datum in yet the next column to the right, and other operators in the same row may result in other commands, according to user's specifications.

Data from the data file continues to be mapped into the range indicated by the various cells in the left-most column of Table 5 until there is no more data in the data file. As the data is mapped, more operators may be encountered, for example, "OUTPUT" in the third column of the N1RL02 element. Again, this operator may be converted into data processing commands in data processing command set 24, which causes processor 12 to place this datum in the sixth column of the N1RL02 element, where processor 12 can output it according to a user's specifications. For example, the "TRIGGER" operator, when encountered in the fourth column of the BOX04 element of Table 5, may be converted into a data processing command that collates and outputs all of the data residing in the sixth column of all elements, according to a system-specific data format.

Using these and other operators, the visual analog may be converted into data processing commands that process the data in a data file and transform the data into a physical representation for human use and interpretation. These data processing commands can handle data that has been stored in a file, or data that is being transmitted as a data stream in real time over a telecommunications medium.

Although the present invention has been described in detail, it should be understood that various changes, substitutions, and alterations can be made hereto without departing from the spirit and scope of the invention as defined by the appended claims.

What is claimed is:

1. A method for processing electronic data, the method comprising:

receiving a transaction set specification for the electronic data, the transaction set specification comprising at least one segment, each segment comprising at least one first element, each first element comprising at least one identifier;

adding a plurality of second elements to the segment, the second elements based on at least some of the first elements and the identifiers associated with the at least some of the first elements;

adding a respective flag to at least one of a one of the first elements and the second elements;

generating a graphical representation of the transaction set specification based on the segments, the first elements, and the second elements;

converting the graphical representation into data processing commands; and processing the electronic data with the data processing commands.

2. The method of claim 1, wherein the transaction set specification is received from a trading partner.

3. The method of claim 1, wherein the transaction set specification comprises a listing of a data format and examples of the electronic data.

4. The method of claim 3, wherein the data format comprises data in an ANSI EDI Standard format.

5. The method of claim 1, wherein the transaction set specification comprises a standardized document.

6. The method of claim 5, wherein the standardized document comprises a document selected from a group consisting of a bill-of-sale, a production schedule, a shipping manifest, and a revenue receipt statement.

7. The method of claim 1, wherein at least one of the segments is defined by a trading partner.

8. The method of claim 1, wherein at least one of the elements is defined by a trading partner.

9. The method of claim 1, wherein adding the second elements is performed free of reference to a standard associated with the transaction set specification.

10. The method of claim 1, wherein the second elements comprise an expansion of each first element with each associated identifier.

11. The method of claim 1, wherein the graphical representation of the transaction set specification is generated with a computer program selected from a group consisting of a word processing program, a graphics program, and a computer aided design program; and further comprising displaying the transaction set specification.

12. The method of claim 1, wherein generating the graphical representation of the transaction set specification further comprises converting the graphical representation of the transaction set specification into a data file.

13. The method of claim 12, wherein converting the graphical representation comprises converting the data file into data processing commands.

14. The method of claim 12, wherein converting the data file into data processing commands comprises:

identifying an operator in the data file of the graphical representation; and correlating the operator to a predetermined data processing command.

15. The method of claim 1, wherein the electronic data is one of a data file and a data stream.

16. The method of claim 1, wherein each flag is capable of designating an operator.

17. The method of claim 1, wherein the flag comprises an operator, and wherein converting the graphical representation into data processing commands comprises converting the operator into a data processing command.

18. The method of claim 17, wherein converting the operator into the data processing commands comprises:

identifying the operator in the graphical representation; and generating a data processing command that corresponds to the operator in the graphical representation.

19. The method of claim 17, wherein the operator comprises an operator selected from the group consisting of an ID code operator, an output operator, and a trigger operator.

20. A system for processing electronic data received by the system, the system comprising:

a processor operable to receive a transaction set specification, and to generate a graphical representation of the transaction set specification, wherein the transaction set specification comprises at least one segment, each segment comprising at least one first element, each first element comprising at least one identifier;

a user interface operable to display the graphical representation of the transaction set specification;

a command set generator operable to convert the graphical representation into data processing commands;

wherein the processor and the user interface are collectively operable to add a plurality of second elements to the segment, the second elements based on at least some of the first elements and the identifiers associated with the respective first elements, and to add a respective flag to at least one of a one of the first elements and the second elements.

21. The system of claim 20, wherein the processor is further operable to process the electronic data with the data processing commands.

22. The system of claim 20, wherein the transaction set specification is received from a trading partner.

23. The system of claim 20, wherein the transaction set specification comprises a listing of a data format and examples of the electronic data.

24. The system of claim 23, wherein the data format comprises data in an ANSI EDI Standard format.

25. The system of claim 20, wherein the transaction set specification comprises a standardized document.

26. The system of claim 25, wherein the standardized document comprises a document selected from a group consisting of a bill-of-sale, a production schedule, a shipping manifest, and a revenue receipt statement.

27. The system of claim 20, wherein at least one of the segments is defined by a trading partner.

28. The system of claim 20, wherein at least one of the elements is defined by a trading partner.

29. The system of claim 20, wherein the second elements are added free of reference to a standard associated with the transaction set specification.

30. The system of claim 20, wherein the second elements comprise an expansion of each first element with each associated identifier.

31. The system of claim 20, wherein the processor is capable of saving the graphical representation as a data file of the graphical representation in a memory.

32. The system of claim 31, wherein the command set generator is capable of converting the data file of the graphical representation into data processing commands.

33. The system of claim 32, wherein the conversion of the data file comprises:
   identifying an operator in the data file of the graphical representation; and
   correlating the operator to a predetermined data processing command.

34. The system of claim 20, wherein the electronic data is one of a data file and a data stream.

35. The system of claim 20, wherein each flag is capable of designating an operator.

36. The system of claim 35, wherein the operator comprises an operator selected from a group consisting of an ID code operator, an output operator, and a trigger operator.

37. The system of claim 20, wherein the conversion of the graphical representation into data processing commands is based on the command set generator identifying an operator in the graphical representation and generating a data processing command corresponding to the operator.

38. A system for processing electronic data, the system comprising:
   means for receiving a transaction set specification for the electronic data, the transaction set specification comprising at least one segment, each segment comprising at least one first element, each first element comprising at least one identifier;
   means for adding a plurality of second elements to the segment, the second elements based on at least some of the first elements and the identifiers associated with the at least some of the first elements;
   means for adding a respective flag to at least one of a one of the first elements and the second elements;
   means for generating a graphical representation of the transaction set specification based on the segments the first elements, and the second elements;
   means for converting the graphical representation into data processing commands, wherein converting the graphical representation comprises converting the operator into a data processing command; and
   means for processing the electronic data with the data processing commands.

* * * * *